United States Patent
Pahlevaninezhad et al.

(10) Patent No.: US 9,859,714 B2
(45) Date of Patent: Jan. 2, 2018

(54) MULTIPLE INPUT THREE-PHASE INVERTER WITH INDEPENDENT MPPT AND HIGH EFFICIENCY

(71) Applicants: Majid Pahlevaninezhad, Kingston (CA); Shangzhi Pan, Kingston (CA); Praveen Jain, Kingston (CA)

(72) Inventors: Majid Pahlevaninezhad, Kingston (CA); Shangzhi Pan, Kingston (CA); Praveen Jain, Kingston (CA)

(73) Assignee: SPARQ SYSTEMS INC., Kingston, Ontario (CA)

( * ) Notice: Subject to any disclaimer, the term of this patent is extended or adjusted under 35 U.S.C. 154(b) by 231 days.

(21) Appl. No.: 14/743,571

(22) Filed: Jun. 18, 2015

(65) Prior Publication Data

US 2016/0372926 A1    Dec. 22, 2016

(51) Int. Cl.
*H02J 3/38* (2006.01)
*H02M 7/48* (2007.01)
*H02M 1/00* (2006.01)

(52) U.S. Cl.
CPC ............. *H02J 3/382* (2013.01); *H02J 3/383* (2013.01); *H02J 3/386* (2013.01); *H02M 7/48* (2013.01); *H02M 2001/007* (2013.01); *Y02E 10/563* (2013.01); *Y02E 10/58* (2013.01); *Y02E 10/763* (2013.01)

(58) Field of Classification Search
None
See application file for complete search history.

(56) References Cited

U.S. PATENT DOCUMENTS

| | | | | |
|---|---|---|---|---|
| 2004/0125618 | A1* | 7/2004 | De Rooij | H02J 1/102 363/17 |
| 2005/0068012 | A1* | 3/2005 | Cutler | H02J 3/383 323/234 |
| 2005/0105224 | A1* | 5/2005 | Nishi | H02M 3/285 361/18 |
| 2010/0133904 | A1* | 6/2010 | Klodowski | H02M 7/48 307/24 |
| 2012/0026769 | A1* | 2/2012 | Schroeder | H02J 3/383 363/131 |
| 2012/0049635 | A1* | 3/2012 | Schelenz | G05F 1/67 307/82 |
| 2012/0098346 | A1* | 4/2012 | Garrity | H02J 3/383 307/82 |
| 2014/0168835 | A1* | 6/2014 | Fornage | H02H 7/20 361/57 |

(Continued)

*Primary Examiner* — Tuan T Lam
(74) *Attorney, Agent, or Firm* — Brion Raffoul

(57) ABSTRACT

Systems, methods, and devices relating to power converters. A power conditioning system uses multiple DC/DC power converter blocks. The output of each of the converter blocks is received by an energy storage and combiner block. The output of the combiner block is then received by a DC/AC inverter. The various components of the power conditioning system are controlled by a central controller. The power semiconductors within each DC/DC converter are controlled by a subsystem of the central controller and MPPT is also provided by the central controller. Also provided for are a novel three-phase DC/AC inverter topology with reduced output ripple and a control scheme for controlling the power semiconductors in the DC/AC inverter.

11 Claims, 10 Drawing Sheets

(56) References Cited

U.S. PATENT DOCUMENTS

| | | | |
|---|---|---|---|
| 2014/0265584 A1* | 9/2014 | Cheng | G08B 13/1409 307/52 |
| 2014/0333141 A1* | 11/2014 | Hu | H01L 31/00 307/84 |
| 2014/0334190 A1* | 11/2014 | Zhang | H02M 3/33507 363/17 |
| 2014/0334211 A1* | 11/2014 | Somani | H02M 7/53875 363/131 |
| 2015/0160676 A1* | 6/2015 | Pan | G05F 1/67 307/82 |
| 2015/0244247 A1* | 8/2015 | Chen | H02M 7/4826 363/131 |
| 2016/0211765 A1* | 7/2016 | Han | H02M 7/42 |
| 2017/0104334 A1* | 4/2017 | Premerlani | H02J 3/383 |
| 2017/0117822 A1* | 4/2017 | Pahlevaninezhad | H01L 31/02021 |

* cited by examiner

MULTIPLE INPUT THREE-PHASE INVERTER WITH INDEPENDENT MPPT AND HIGH EFFICIENCY

TECHNICAL FIELD

The present invention relates to systems, methods, and devices relating to converting power from DC power generation sources to AC power for use in a power grid. More specifically, the present invention relates to using multiple DC power generation sources to produce three-phase AC power using a single controller for multiple DC/DC converters with maximum power point tracking (MPPT).

BACKGROUND OF THE INVENTION

There is a growing number of photovoltaic (PV) applications where direct current/alternating current (DC/AC) inverters are required to provide independent maximum power point tracking (MPPT) at multiple inputs to harvest maximum solar energy from PV panels and to thereby feed clean AC electricity into the power grid. FIG. 1 is a circuit diagram of such an inverter using conventional technology and according to the prior art. As can be seen, each one of multiple power generators is independently coupled to a power conditioning sub-system with a DC/DC converter. Each sub-system has a power generator, a DC/DC converter, an energy storage module, a DC/AC inverter, and a specific digital controller that controls the various components of that sub-system. Unfortunately, this configuration is not only expensive but also quite complex, large, and heavy. Installation and maintenance for such systems are both costly and quite inconvenient.

Another issue which must be addressed is that, for each sub-system, the DC/AC inverter usually operates under hard-switching where neither the voltage nor the current of the power switches is zero during the switching transitions. The power semiconductors of the DC/AC inverter are switched under very high voltage and the intermediate DC-bus semiconductors in such inverters significantly contribute to the overall losses of the power conditioning system. In particular, reverse recovery losses of the power semiconductors' body diodes are inevitable for such topologies. Because of this, the switching frequency of the inverter is very limited, usually in the range of 10-20 kHz. Because of strict regulatory standards, high quality current needs to be injected into the utility grid from such inverter systems. To produce such high quality currents, such inverters require large filters at their outputs.

Another issue with low switching frequencies is that such low frequencies create a high amount of current ripple across the inverter output inductor. This current ripple not only increases the core losses of the inductor but also increases the inductor's high frequency copper losses. In addition to this, reducing the DC-bus voltage creates a significant amount of conduction and emission EMI noise. The high amount of conduction and emission EMI noise may affect the operation of the control system and may highly degrade the system's reliability. From all of the above, hard-switching limits the switching frequency of the inverter and imposes a substantial compromise in the design of the output filter and in the overall performance of the power conditioning sub-systems.

FIG. 2 shows a conventional three-phase DC/AC inverter according to the prior art. According to FIG. 2, the inverter includes three legs with each leg including two power semiconductors coupled in series. Each leg is coupled to an output inductor at a coupling node between the two power semiconductors. Each output inductor is then coupled to the power grid. The inductors filter out the switching harmonics of the inverter and produce a fairly clean sinusoidal current waveform. Due to the limited switching frequency of the DC/AC inverter, the output inductors are usually large and bulky in order to produce a reasonably clean current for the utility grid. While it is possible to use an LCL-filter instead of an L-filter at the output of the three-phase DC/AC inverter, six inductors would be required as well as sensing circuitry for the currents of the 6 inductors. Such an implementation of an LCL-filter for the output of the inverter would not be very cost-effective or practical.

Based on the above, there is therefore a need for systems and devices which mitigate if not avoid the shortcomings of the prior art.

SUMMARY OF INVENTION

The present invention provides systems, methods, and devices relating to power converters. A power conditioning system uses multiple DC/DC power converter blocks. The output of each of the converter blocks is received by an energy storage and combiner block. The output of the combiner block is then received by a DC/AC inverter. The various components of the power conditioning system are controlled by a central controller. The power semiconductors within each DC/DC converter are controlled by a subsystem of the central controller and MPPT is also provided by the central controller. Also provided for are a novel three-phase DC/AC inverter topology with reduced output ripple and a control scheme for controlling the power semiconductors in the DC/AC inverter.

In a first aspect, the present invention provides a system for converting power from at least one DC power source for transmission to an AC power grid, the system comprising:
- at least one DC/DC converter block, each DC/DC converter block being for receiving DC power from one of said at least one DC power source and for producing a power output;
- an energy storage and combiner block for receiving said power output of said at least one DC/DC converter block;
- a DC/AC inverter block for receiving a power output of said energy storage and combiner block, said DC/AC inverter block producing an AC power output for transmission to said AC power grid;
- a controller block for controlling each of said at least one DC/DC converter blocks, said energy storage and combiner block, and said DC/AC inverter block;

wherein
- said controller block receives power and voltage characteristics of each of said at least one DC power source;
- said controller block receives power and voltage characteristics of said AC power output of said DC/AC inverter block;
- said controller block receives voltage characteristics of said power output of said energy storage and combiner block;
- said controller block provides control gate pulses for each of said at least one DC/DC converter blocks and for said DC/AC inverter block.

In a second aspect, the present invention provides a DC/AC inverter system for producing a three phase AC current suitable for insertion into an AC power grid, said DC/AC inverter system comprising:

three semiconductor legs connected in parallel to one another;
an input capacitor coupled in parallel to said semiconductor legs;
three output inductors, each inductor being coupled between a semiconductor leg and said AC power grid;
wherein
each semiconductor leg comprises two power semiconductor devices coupled in series with one output inductor being coupled to a coupling node between said two power semiconductor devices;
an input to said system comprises DC power provided in parallel to said semiconductor legs;
and
wherein said DC/AC inverter system is controlled by a digital controller block comprising:
a digital current controller, said digital current controller receiving current and voltage characteristics from each of said three output inductors;
a digital voltage controller, said digital voltage controller receiving a voltage characteristic of an input voltage to said DC/AC inverter block, said digital voltage controller sending a reference current to said digital current controller and receiving a reference voltage;
an optimal frequency calculator receiving a current and a voltage from one of said three output inductors;
a hybrid modulator receiving an optimal frequency signal from said optimal frequency calculator and duty ratio values for each of said three semiconductor legs from said digital current controller, said hybrid modulator producing gate pulses for said power semiconductor devices in said DC/AC inverter block.

In a third aspect, the present invention provides a DC/DC converter system comprising:
an input capacitor coupled in parallel between a positive input and a negative input from a DC power source;
an inverter circuit coupled in parallel to said input capacitor;
a transformer circuit coupled to said inverter circuit, said transformer circuit receiving a current output of said inverter circuit;
a rectifier circuit receiving an output of said transformer circuit;
an output capacitor coupled in parallel to said rectifier circuit;
an output inductor coupled in series between an output node of said converter block and a positive node coupled to both said rectifier circuit and said output capacitor;
wherein
control gate pulses for semiconductors in said inverter circuit are received from a digital controller;
said digital controller determines said control gate pulses based on voltage and current characteristics of power received from said DC power source.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
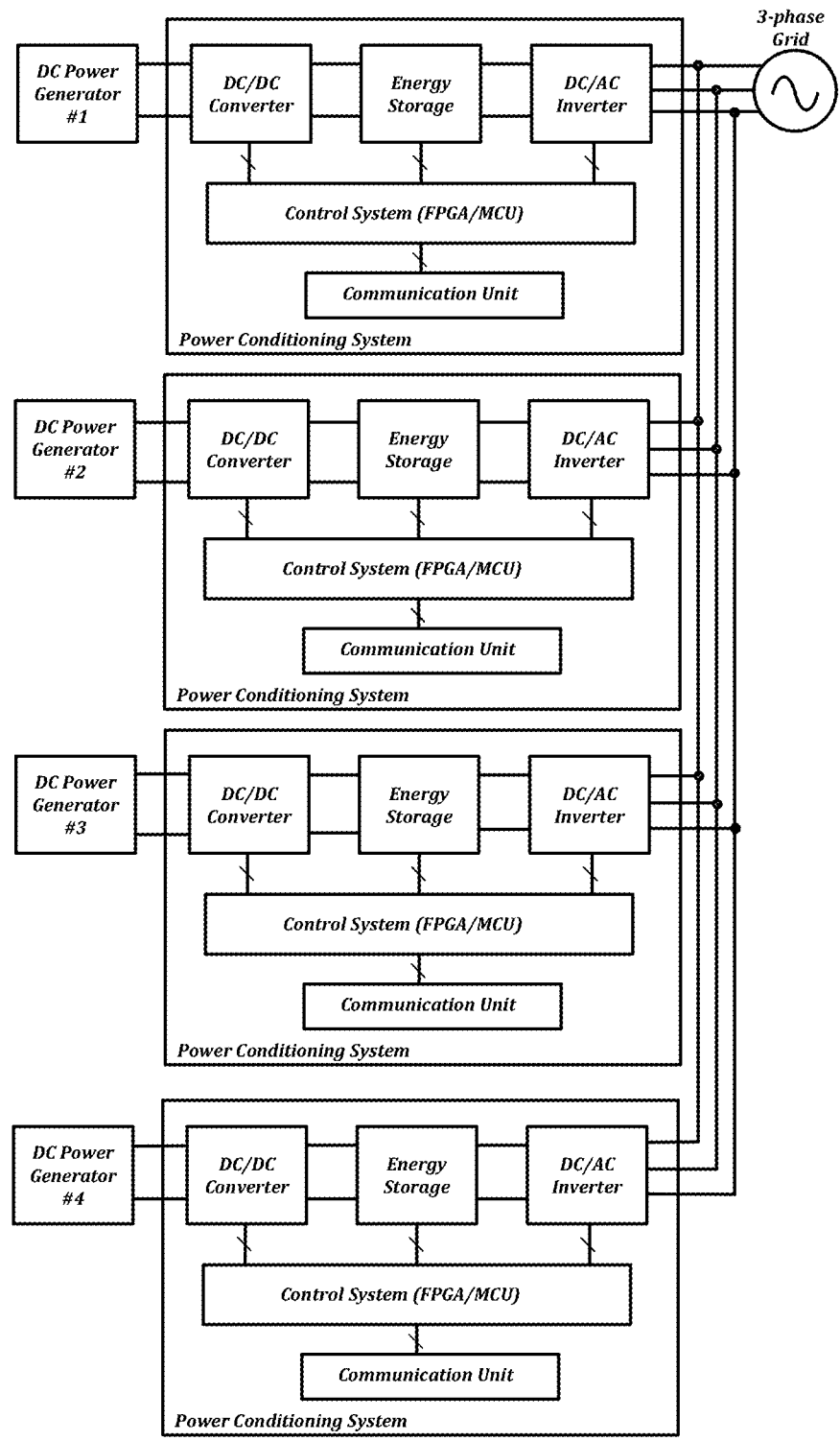
FIG. 1 is a block diagram of multiple power conditioning systems according to the prior art.
Figure 2:
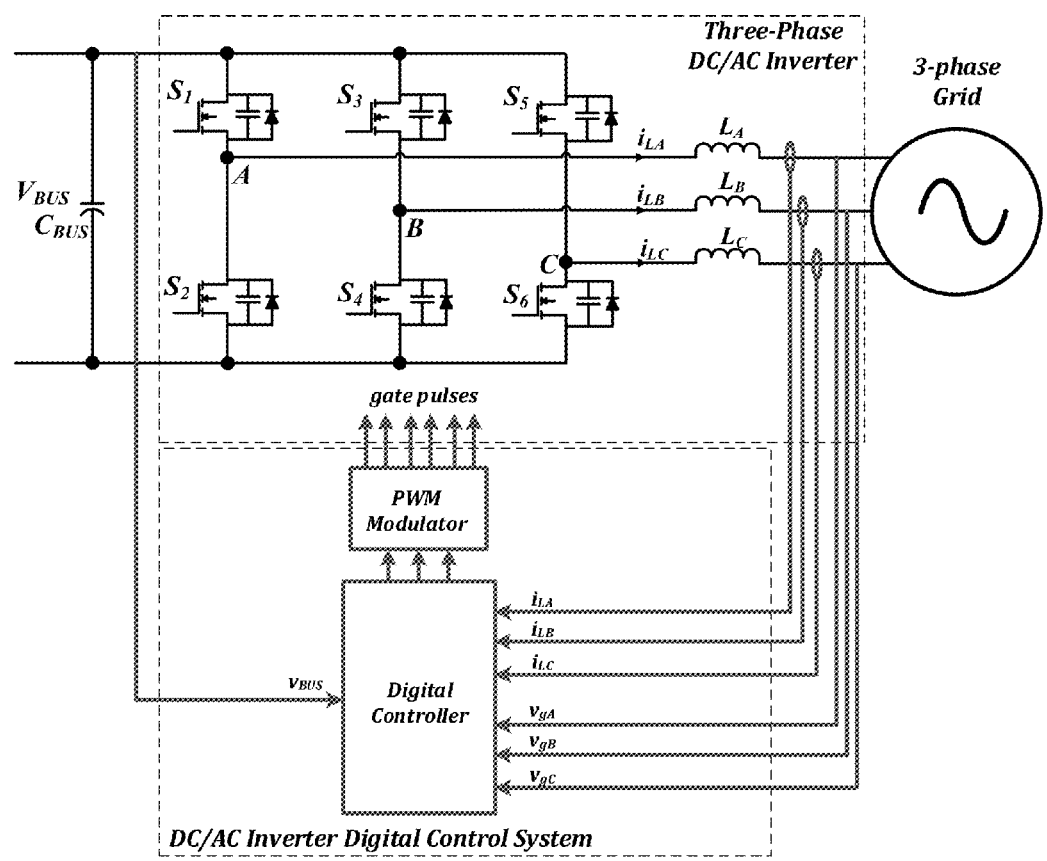
FIG. 2 is a circuit diagram of a control scheme for an DC/AC inverter according to the prior art.
Figure 3:
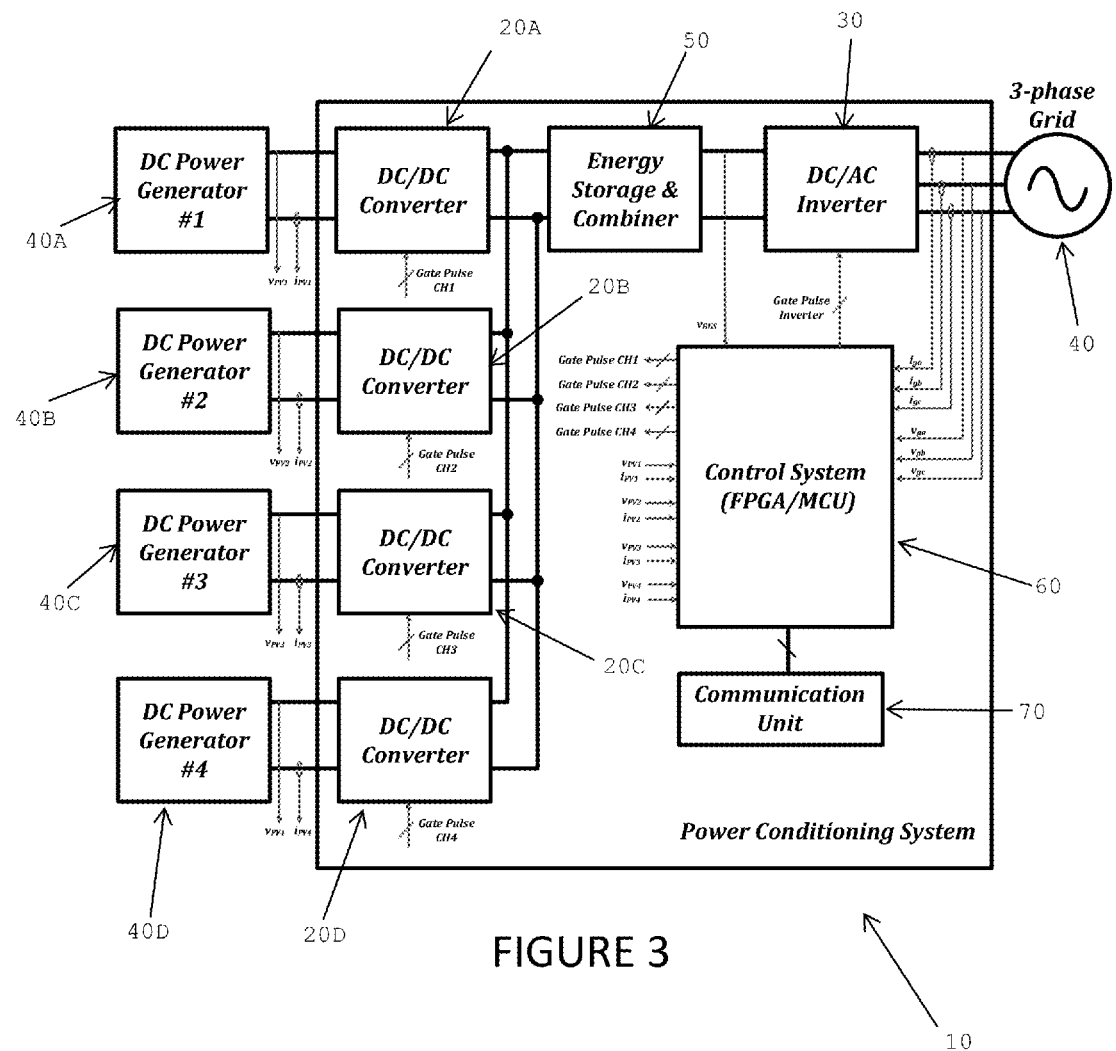
FIG. 3 is a block diagram of a power conditioning system according to one aspect of the invention.

Referring to FIG. 3, a block diagram of a system according to one aspect of the invention is illustrated. FIG. 3 illustrates a novel inverter topology for extracting power from one or more DC power sources and for delivering power to a three-phase power grid. The system 10 has four input stages (DC/DC converter 20A, 20B, 20C, 20D), and one output stage (DC/AC inverter 30). Each input stage receives DC power from a DC power generator or DC power source 40A, 40B, 40C, 40D. The output stage injects power into a three-phase AC power grid 40. The DC/AC inverter 30 receives an output of an energy storage and combiner block 50. This block 50, in turn, receives the output of all the input stages.

All the input stages, as well as the DC/AC inverter output stage 30 are controlled by a central digital controller 60. The energy storage and combiner block 50 stores and combines the outputs of the multiple DC/DC input stages before combining them for transfer to the DC/AC inverter output stage 30. Also present is a communication unit 70 which sends and receives communications from the control system. The communications unit can be used to report conditions encountered by the controller 60 or it can be used to change the parameters used by the controller 60.

In the system in FIG. 3, each one of the multiple input stages is independent of one another. Each input stage is fed by a DC power generator 40A, 40B, 40C, 40D, such as a PV module. The input stage processes power received from the DC power source and converts it into a desired form. The energy storage and combiner combines all energy from the four input stages, thereby creating an intermediate DC bus. A DC/AC inverter 30 is connected to the intermediate DC bus and converts the DC power into AC form and injects the resulting AC current into the AC grid. The energy storage and combiner also works as energy decoupling between DC power and AC power. A digital controller collects all input voltage and current information from all multiple inputs, intermediate DC bus voltage information, and three-phase grid current and three-phase voltage information. The digital controller implements a control method using the collected input and output information, and then generates different gate signals for all multiple input stages and for the DC/AC inverter. As can be seen from FIG. 3, each input stage in the system consists of a DC/DC converter. Other configurations with other components are, of course, possible.

From FIG. 3, it should be clear that the digital controller receives the current and voltage value signals from the various DC power generation sources. As well, the digital controller receives the DC bus voltage from the energy storage and combiner block. The grid currents and the grid voltages are also received from the DC/AC inverter output block. The digital controller produces control signals for each one of the input stages as well as for the DC/AC block. While FIG. 3 illustrates four input stages, other configurations with differing numbers of input stages, are also possible.

Figure 4:
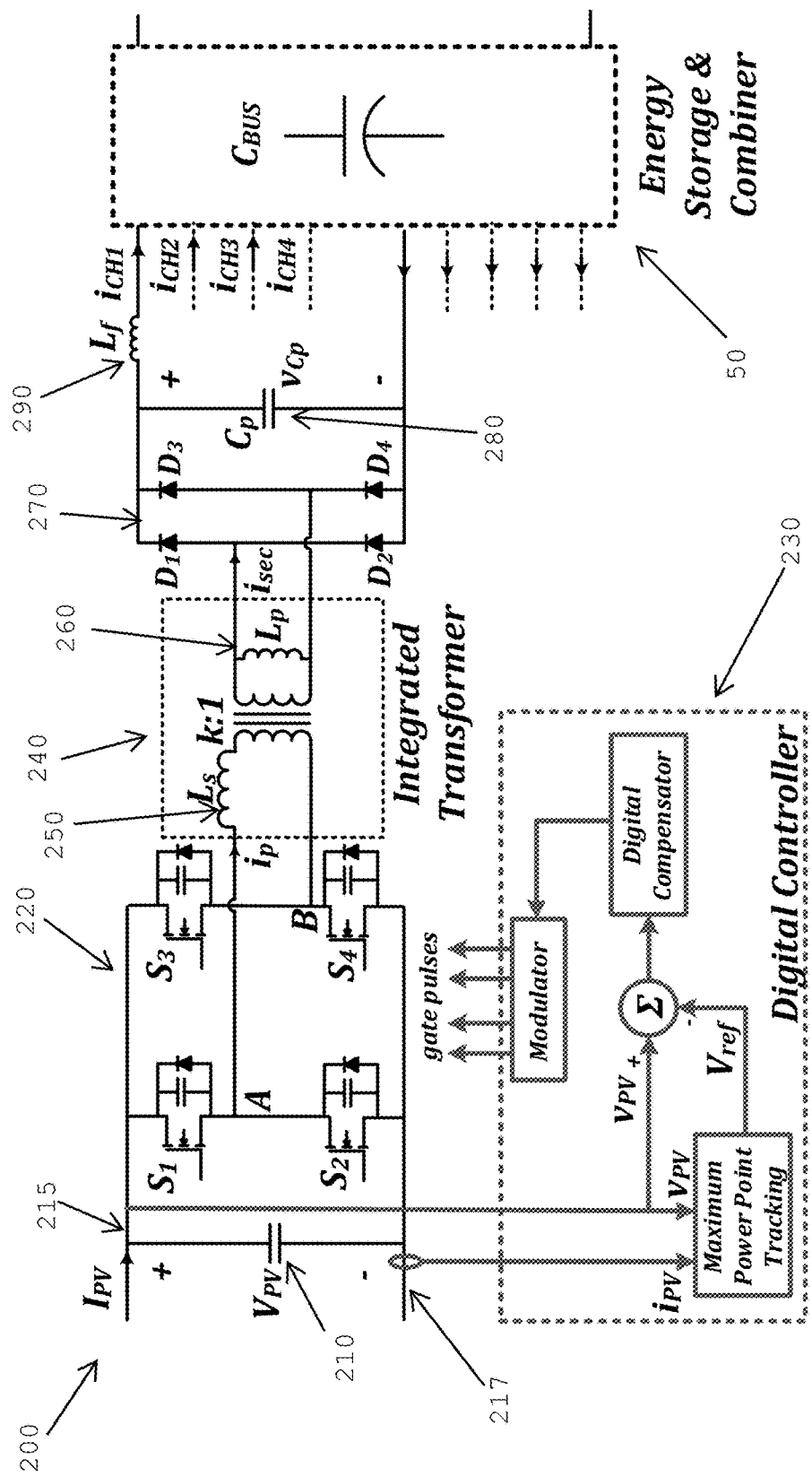
FIG. 4 is a circuit diagram of a DC/DC converter block which provides independent MPPT according to another aspect of the invention.

Referring to FIG. 4, a diagram of a DC/DC converter configuration used with one implementation of the invention is illustrated. As can be seen, the DC/DC converter 200 is fed by a PV (photovoltaic) module. A DC capacitor 210 is coupled between the two input points 215, 217 for the PV module. The DC capacitor 210 is coupled to an inverter circuit 220 whose control signals are received from a digital sub-block 230. The digital sub-block 230 receives the current and voltage of the DC power source (a PV module in this case) and, based on these inputs, provides suitable control signals for the semiconductors in the inverter 220. Coupled to the inverter 220 is an integrated transformer 240. In this implementation, the integrated transformer includes a series inductance 250 and a parallel inductance 260. The integrated transformer is then coupled to a rectifier circuit 270. The output of the rectifier circuit is coupled to a parallel output capacitor 280. The output of the rectifier circuit feeds energy into the energy storage and combiner block 50 through an inductor 290 which is coupled between the positive lead of the rectifier circuit and the combiner block 50.

The function of each component within the DC/DC converter 200 is clear. The DC/DC converter has a DC capacitor 210 connected across the high side 215 and low side 217 input points from the PV module, a voltage inverter 220 such as full bridge inverter (or a half-bridge inverter), an isolating integrated transformer 240, a rectifier circuit 270, and an output LC filter (elements 280, 290). The voltage inverter converts the voltage on the DC capacitor 210 into a high frequency AC voltage while rejecting the voltage oscillations caused by the instantaneous output power oscillation originating from the AC grid. The integrated transformer 240 converts the high frequency voltage pulses into current pulses and provides galvanic isolation and also a voltage boost. The rectifier circuit 270 converts the high frequency current pulses into a rectified triangular DC current. These current pulses are filtered by the output filter consisting of a parallel capacitor 280 and series inductor 290.

Since each DC/DC converter is independent of the other DC/DC converters, the outputs of all the DC/DC converters are received by the combiner block. Once the rectified triangular DC current has been filtered by the output filter of each individual DC/DC converter, the output DC currents from each of the various input stages (i.e. the various DC/DC converters) are injected into an energy storage capacitor within the energy storage and combiner block to produce an intermediate DC voltage bus. This intermediate DC voltage is then converted into line frequency sinusoidal current by the DC/AC output stage. The line frequency sinusoidal current is then fed to the AC power grid.

It should be clear that while FIG. 4 refers to the DC power generation source as a PV module, other DC power generation sources are possible. Such DC power generation sources may include a solar farm, a photo-voltaic (PV) panel, a wind farm, a wind driven power turbine, a water driven power turbine, a wave driven power turbine, or a gas powered power turbine.

Figure 4A:
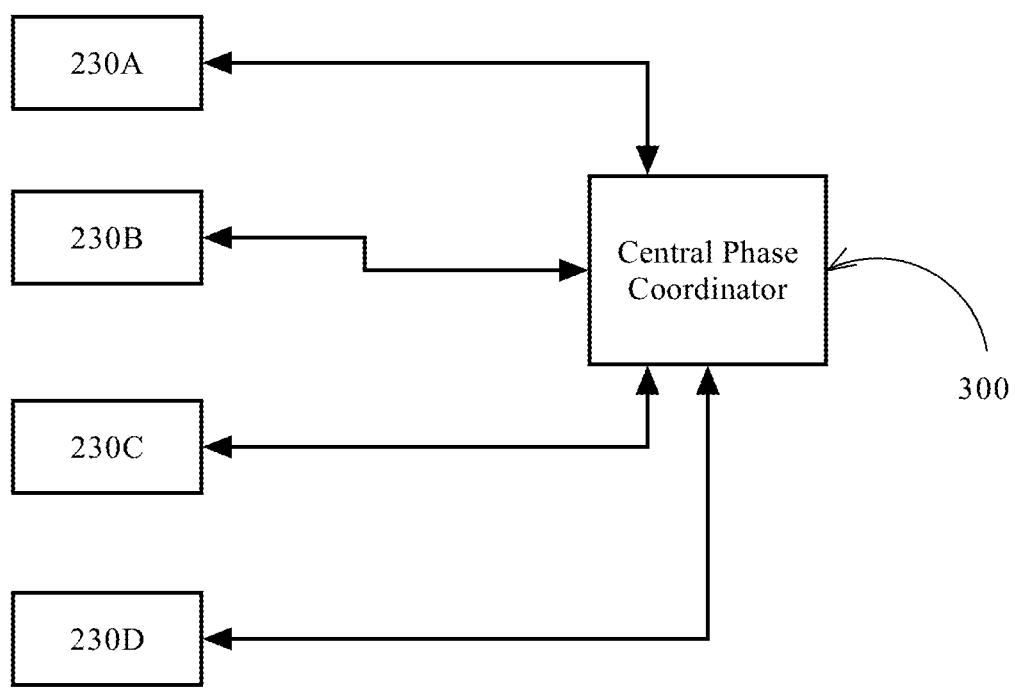
FIG. 4A is a block diagram detailing a control scheme for controlling the various DC/DC converter blocks illustrated in FIG. 3.

Referring to FIG. 4A, a block diagram of a portion of the digital controller 60 is illustrated. As can be seen, this portion of the digital controller 60 includes a sub-block 230A, 230B, 230C, 230D for each of DC/DC converters illustrated in FIG. 3. Each of the sub-blocks sends a signal indicative of the input power being received from the DC power generation source and sends this signal to a central phase coordinator 300. In addition to this signal detailing the characteristics of the input power, each one of the sub-blocks sends a signal to the central phase coordinator indicative of the frequency of the input power from the DC power generation source. In return, each sub-blocks receives an optimum phase value from the central phase coordinator 300. The sub-blocks then adjust the gate signals to be sent to the inverter in the DC/DC converter so that the output signal from the DC/DC converter has that optimum phase value. This is performed to minimize the DC bus RMS current for the power being sent to the DC/AC inverter block.

Figure 5:
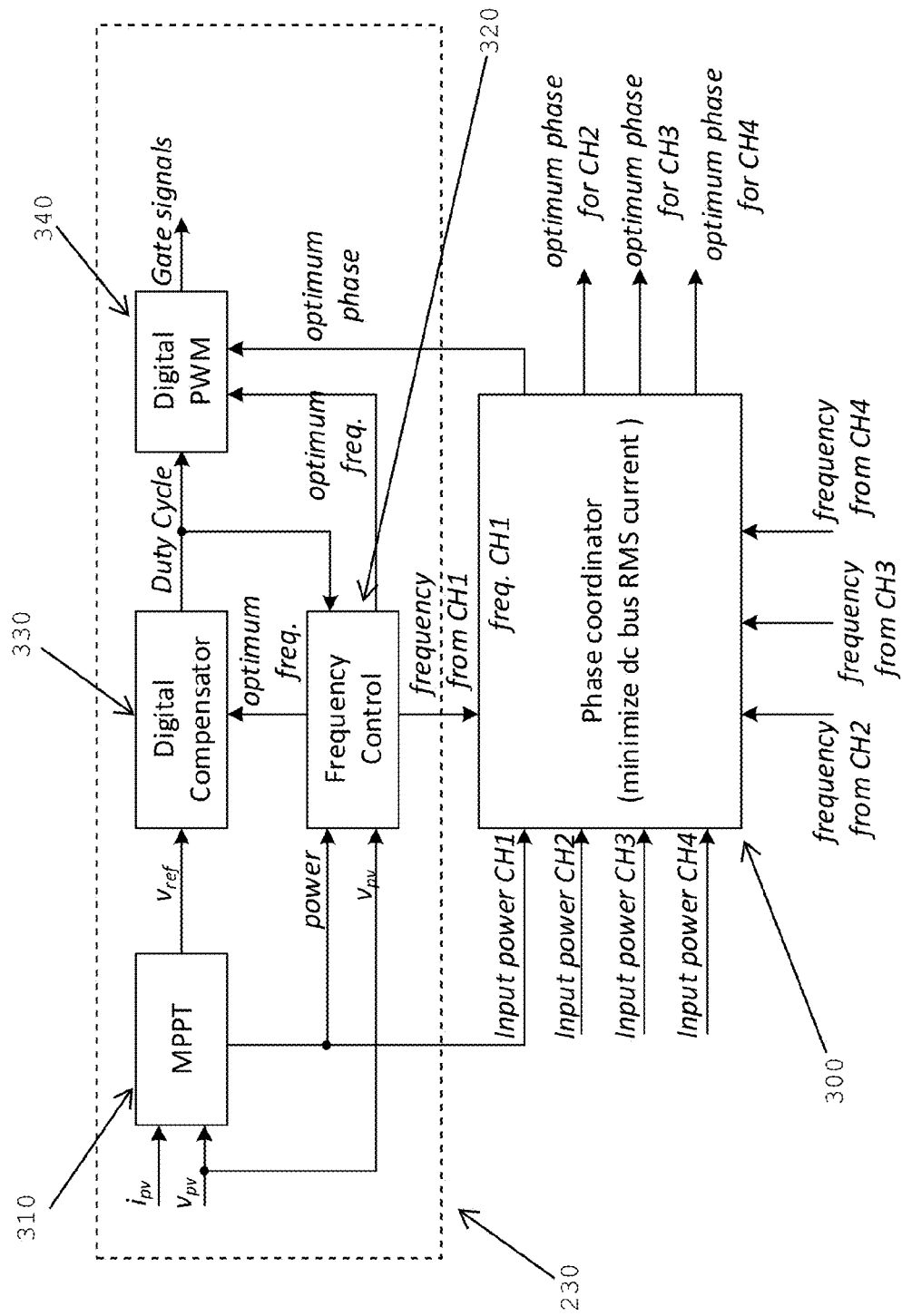
FIG. 5 is an interleaved control scheme detailing the modules in one control sub-system for one of the DC/DC converter blocks illustrated in FIG. 3.

Referring to FIG. 5, a block diagram of a sub-block 230 within the digital controller 60 is illustrated. The use of this sub-block 230 within the single digital controller 60 provides the following functions simultaneously:

- independent control of MPPT for each one of the multiple DC power generation sources;
- low-frequency ripple rejection from each one of the multiple DC power generation sources;
- high frequency near lossless switching of each input DC/DC converter;
- optimum phase sequencing of each input DC/DC converter to minimize the high frequency ripple from the DC bus; and
- minimization of the DC bus capacitor.

Referring to FIG. 5, the sub-block 230 controls a specific DC/DC converter in a specific input stage of the power conditioning system. A maximum power point tracking (MPPT) module 310 receives the current and voltage values for the PV module (or the DC power generation source). The MPPT module 310 produces a power signal that is received, along with the voltage value for the PV module, by a frequency control module 320. The MPPT module 310 also produces a reference voltage signal that is received by a digital compensator module 330. This digital compensator module 330 receives an optimal duty cycle signal from the frequency control module 320 and produces a duty cycle signal. The duty cycle signal is fed to the frequency control module as well as to a digital pulse width modulation (PWM) module 340. This PWM module 340 receives an optimum phase signal from a phase coordinator module 300 and an optimal frequency signal from the frequency control module 320. Based on these inputs, the PWM module 340 produces control signals for the specific DC/DC converter in an input stage. The phase coordinator module 300 coordinates the various phases of the various input stages (i.e. the various DC/DC converters). The phase coordinator module 300 receives the power signal from the various MPPT modules of the different DC/DC converters as well as the optimum frequency signal from the various frequency control modules of the different DC/DC converters as explained in relation with FIG. 4A above. This phase coordinator module 300 produces the optimum phases for the various DC/DC converters to thereby minimize DC bus RMS current.

The control technique used in the present invention optimizes the switching frequency as well as the duty-cycle of the multiple DC/DC converters in order to achieve minimum power losses and zero voltage switching. The optimization method is used to determine the optimal frequency value as well as the optimal duty-cycle for each DC/DC converter in order to minimize the RMS (Root-Mean-Square) value of the integrated transformer current.

Figure 6:
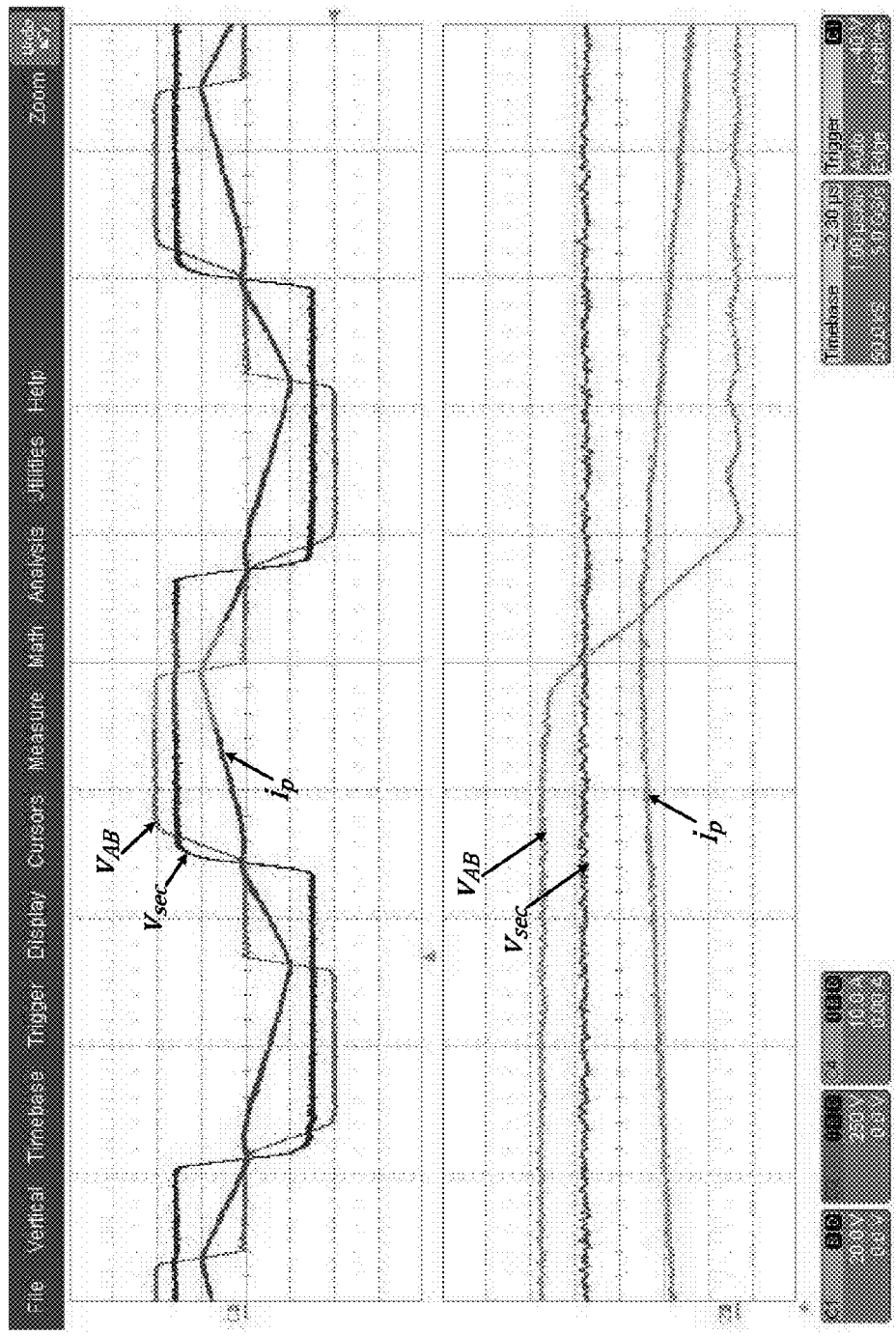
FIG. 6 illustrated experimental waveforms for the DC/DC converter illustrated in FIG. 4.

FIG. 6 shows the experimental waveforms for the DC/DC converter. This figure shows the output voltage of the full-bridge inverter ($v_{AB}$), the primary side current of the integrated transformer ($i_p$), and the voltage at the output of the integrated transformer ($v_{sec}$). The lower waveform in FIG. 6 is a magnified view of a portion of the upper waveform.

The three-phase DC/AC inverter in the second stage has two main difficulties: hard-switching of the power semiconductors and high current ripples of the output inductors. The hard switching causes power losses due to the switching of the power semiconductors and this significantly limits the allowable switching frequency of the DC/AC inverter, leading to large current ripples across the output inductors. The current ripple across the output inductor also further increases power losses. The current ripple produces core losses as well as high frequency copper losses. Since the switching frequency is limited (due to the hard-switching) in the DC/AC inverters, usually bulky inductors are used at the outputs of the DC/AC inverters.

Figure 7:
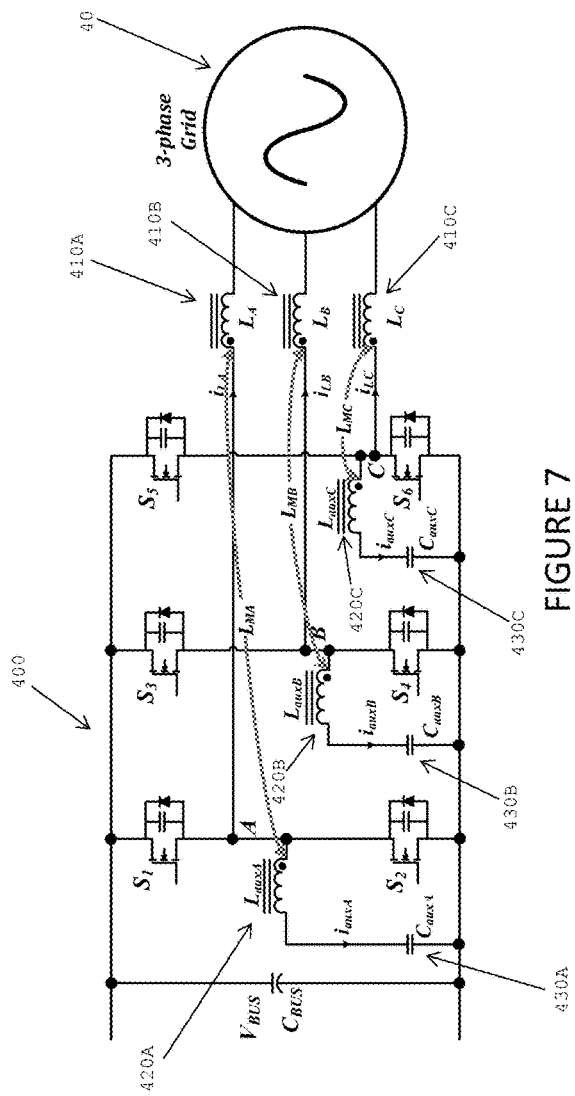
FIG. 7 is a circuit diagram of a ZVS (zero voltage switching) three-phase DC/AC inverter with reduced output ripple according to another aspect of the invention.

Referring to FIG. 7, illustrated is a circuit according to another aspect of the present invention. FIG. 7 shows a Zero-Voltage-Switching (ZVS) three-phase DC/AC inverter with ripple attenuation for the output inductors. The three-phase DC/AC inverter 400 comprises a three-leg inverter, three output inductors 410A, 410B, 410C, which are magnetically coupled to three auxiliary inductors 420A, 420B, 420C. Each auxiliary inductor is also coupled in series to a corresponding auxiliary capacitor 430A, 430B, 430C. As can be seen, each leg of the three leg inverter has a pair of power semiconductors coupled in series with a coupling point in between the two semiconductors. For each leg, an output inductor is coupled between the coupling point and the grid. Also, for each leg, between the coupling point and ground are the auxiliary inductor and the auxiliary capacitor coupled in series. This topology virtually steers the ripple of the output inductors to the power semiconductors through magnetic coupling in order to provide ZVS for the power semiconductors. The advantages of this topology are two-fold: the power semiconductors are soft-switched and the current ripple and losses associated with the output inductors are significantly attenuated.

It should be noted that the output inductors and auxiliary inductors can be coupled in various ways. In one implementation, the inductors are magnetically coupled to one another by being wound on the same core in a specific manner such that this produces a certain self-inductance for each inductor as well as mutual inductance for each other. In another implementation, the output inductors and auxiliary inductors could be wound on separate cores.

The coupling between the inductors is able to effectively attenuate the current ripples of the output inductors and to also provide a high quality current for the grid.

Figure 8:
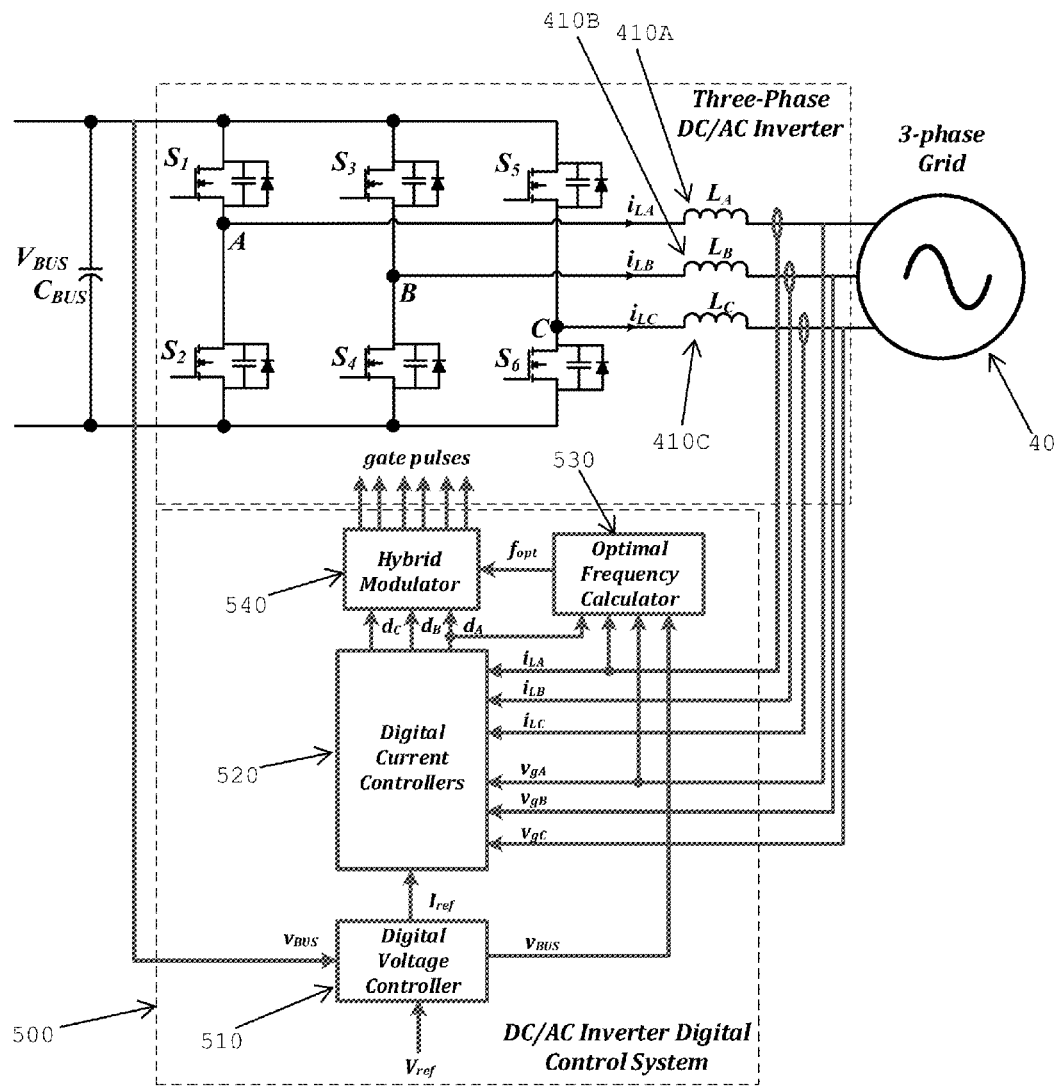
FIG. 8 is a block diagram detailing the digital control system according to another aspect of the invention for a ZVS three-phase DC/AC inverter.

FIG. 8 shows the block diagram of the closed-loop control system for the three-phase ZVS DC/AC inverter according to another aspect of the invention. In FIG. 8, the closed-loop control system 500 includes a digital voltage controller 510, which generates the reference value for the amplitudes of the grid currents, a digital current control loop which adjusts the duty ratios of the gate pulses of the three-phase ZVS DC/AC inverter (using a Digital Current Controllers block 520) and an Optimal Frequency Calculator 530 in a control loop which determines the optimal switching frequency of the three-phase ZVS DC/AC inverter. As can be seen from FIG. 8, a reference voltage $V_{ref}$ is received by the Digital Voltage Controller 510 along with a feedback signal $V_{BUS}$ from the three-phase ZVS DC/AC inverter. The Digital Voltage Controller 510 generates the reference value for the amplitudes of the inverter output currents. This reference value is received by the Digital Current Controllers block 520. The Digital Current Controllers block 520 also receives the grid currents and grid voltages from the three-phase ZVS DC/AC inverter. The Digital Current Controllers 520 generate the duty ratios of the gate pulses of the three-phase ZVS DC/AC inverter. The duty ratios are received by the Hybrid Modulator 540. The Hybrid Modulator 540 also receives the optimal value of the switching frequency calculated by the Optimal Frequency Calculator 530. The Optimal Frequency Calculator 530 determines the optimal switching frequency of the three-phase ZVS DC/AC inverter based on the grid voltage, grid current, duty ratio and the DC-bus voltage.

The controller scheme illustrated in FIG. 8 provides a number of functions and advantages including:
- generation of modified PWM signals to mitigate the non-characteristic harmonics from the grid current that may otherwise be produced due to the low value of the DC bus capacitor;
- soft-inrush current control of the grid current;
- non-islanding operation of the DC/AC inverter system;
- active power control at the grid;
- reactive power control at the grid;
- communications with the user(s).

Figure 9:
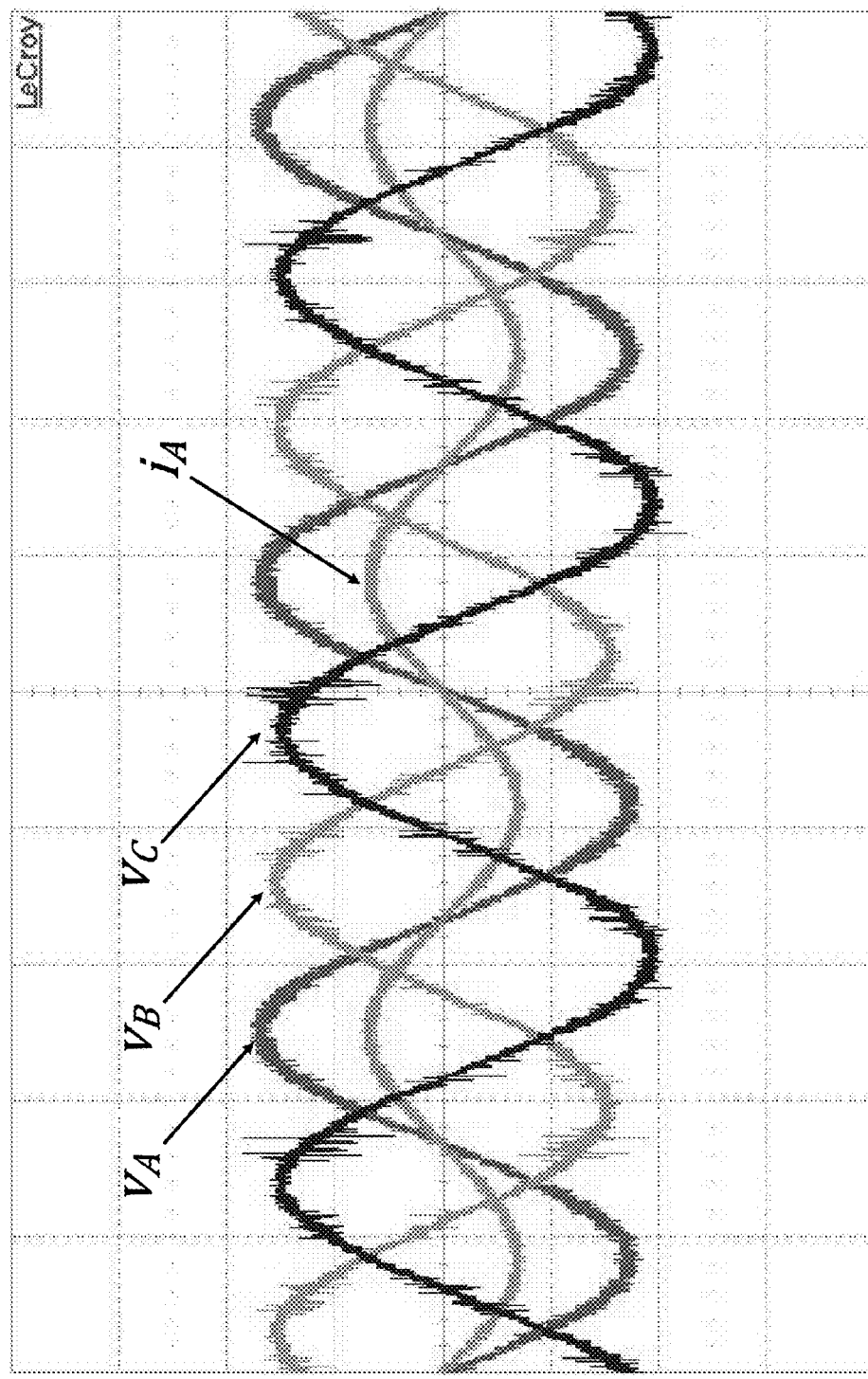
FIG. 9 details experimental waveforms for the ZVS three-phase DC/AC inverter.

Referring to FIG. 9, the figure shows the experimental waveforms for the ZVS three-phase DC/AC inverter. The voltages of the three-phase system, $v_A$, $v_B$, $v_C$, and the current of phase A, $i_A$, are shown in this figure. From this illustration, it can be seen that that the current injected to the utility grid has a very low ripple due to the ripple attenuation technique used in the present invention.

The controller can be implemented as a collection of discrete control element blocks with the functions as noted above. Alternatively, the controller can be implemented in an ASIC (application specific integrated circuit) or as a program executing on a general purpose data processing device with suitable input/output modules which can receive/measure power, current, and/or voltage values from the various components of the system.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for converting power from at least one DC power source for transmission to an AC power grid, the system comprising:
    at least one DC/DC converter block, each DC/DC converter block being for receiving DC power from one of said at least one DC power source and for producing a power output;
    an energy storage and combiner block for receiving said power output of said at least one DC/DC converter block;
    a DC/AC inverter block for receiving a power output of said energy storage and combiner block, said DC/AC inverter block producing an AC power output for transmission to said AC power grid;
    a controller block for controlling each of said at least one DC/DC converter blocks, said energy storage and combiner block, and said DC/AC inverter block;
    wherein
    said controller block receives power and voltage characteristics of each of said at least one DC power source;
    said controller block receives power and voltage characteristics of said AC power output of said DC/AC inverter block;
    said controller block receives voltage characteristics of said power output of said energy storage and combiner block;
    said controller block provides control gate pulses for each of said at least one DC/DC converter blocks and for said DC/AC inverter block;
    wherein said DC/AC inverter block produces a three phase AC current suitable for insertion into an AC power grid and said DC/AC inverter block comprises:
        three semiconductor legs connected in parallel to one another;
        an input capacitor coupled in parallel to said semiconductor legs;
        three output inductors, each inductor being coupled between a semiconductor leg and said AC power grid;
    wherein each semiconductor leg comprises two power semiconductor devices coupled in series with one output inductor being coupled to a coupling node between said two power semiconductor devices;
    and
    wherein said DC/AC inverter block is controlled by a digital control sub-block comprising:
        a digital current controller, said digital current controller receiving current and voltage characteristics from each of said three output inductors;
        a digital voltage controller, said digital voltage controller receiving a voltage characteristic of an input voltage to said DC/AC inverter block, said digital voltage controller sending a reference current to said digital current controller and receiving a reference voltage;
        an optimal frequency calculator receiving a current and a voltage from one of said three output inductors;
        a hybrid modulator receiving an optimal frequency signal from said optimal frequency calculator and duty ratio values for each of said three semiconductor legs from said digital current controller, said hybrid modulator producing gate pulses for said power semiconductor devices in said DC/AC inverter block.

2. A system according to claim 1 wherein said at least one DC/DC converter block comprises:
    an input capacitor coupled in parallel between a positive input and a negative input from a DC power source;
    an inverter circuit coupled in parallel to said input capacitor;
    a transformer circuit coupled to said inverter circuit, said transformer circuit receiving a current output of said inverter circuit;
    a rectifier circuit receiving an output of said transformer circuit;
    an output capacitor coupled in parallel to said rectifier circuit;
    an output inductor coupled in series between an output node of said converter block and a positive node coupled to both said rectifier circuit and said output capacitor;
    wherein
    control gate pulses for semiconductors in said inverter circuit are received from a digital controller sub-block;
    said digital controller sub-block determines said control gate pulses based on voltage and current characteristics of power received from said DC power source.

3. A system according to claim 1 wherein said controller block comprises:
    at least one digital controller sub-block for controlling a specific DC power output of a specific DC/DC converter block receiving power from a specific DC power source; and
    a central phase coordinator for coordinating a phase of DC power outputs from said at least one DC/DC converter block.

4. A system according to claim 3 wherein said at least one digital controller sub-block comprises:
- a maximum power point tracking (MPPT) module for receiving voltage and current characteristics of a specific input power from said specific DC power source and for producing a reference voltage and a power signal from said specific input power;
- a digital compensator module for receiving said reference voltage from said MPPT module and for producing a duty cycle signal;
- a frequency control module for producing a frequency control signal indicative of an optimum frequency for said specific DC power output of said specific DC/DC converter, said frequency control signal being sent to said digital compensator module, said frequency control module also receiving said duty cycle signal, said power signal, and a voltage signal from said specific DC power source;
- a digital pulse width modulation (PWM) module for receiving said duty cycle signal and said frequency control signal, said digital PWM module also being for producing control gate pulses for semiconductors in said specific DC/DC converter block;

wherein
- said digital PWM module receives a phase control signal indicative of an optimum phase for an output of said DC/DC converter block from said central phase coordinator;
- said frequency control module sends a frequency of said specific input power to said central phase coordinator;
- said central phase coordinator also receives said specific input power from said MPPT module.

5. A system according to claim 1 wherein each of said semiconductor legs comprises:
- an auxiliary capacitor and an auxiliary inductor coupled in series between said coupling node and ground;

wherein said auxiliary inductor is coupled to a corresponding one of said output inductors, said corresponding one of said output inductors being coupled between said coupling node and said AC power grid.

6. A system according to claim 1 wherein said at least one DC power source comprises at least one of:
- a solar farm;
- a photo-voltaic (PV) panel;
- a wind farm;
- a wind driven power turbine;
- a water driven power turbine;
- a wave driven power turbine; and
- a gas powered power turbine.

7. A system according to claim 1 further comprising a communications block coupled to said controller block, said communications block being for sending and receiving parameters for use by said controller block.

8. A system according to claim 2 wherein said inverter circuit is a full inverter circuit.

9. A system according to claim 2 wherein said inverter circuit is a half inverter circuit.

10. A system according to claim 2 wherein said controller block provides maximum power point tracking (MPPT) and controls said control gate pulses based on said MPPT.

11. A system according to claim 10 wherein said digital controller sub-block is part of said controller block.

* * * * *